(12) United States Patent
Kipfer

(10) Patent No.: US 8,057,628 B2
(45) Date of Patent: Nov. 15, 2011

(54) COMPLEX SECTION CONSISTING OF A METAL SECTION COVERED WITH A METAL FOIL

(75) Inventor: Denis Kipfer, Rammersmatt (FR)

(73) Assignee: Profiline, Societe a Responsabilite Limitee, Cernay (FR)

( * ) Notice: Subject to any disclaimer, the term of this patent is extended or adjusted under 35 U.S.C. 154(b) by 140 days.

(21) Appl. No.: 12/515,327

(22) PCT Filed: Nov. 15, 2007

(86) PCT No.: PCT/FR2007/052349
§ 371 (c)(1),
(2), (4) Date: May 27, 2009

(87) PCT Pub. No.: WO2008/059179
PCT Pub. Date: May 22, 2008

(65) Prior Publication Data
US 2010/0012264 A1    Jan. 21, 2010

(30) Foreign Application Priority Data
Nov. 16, 2006 (FR) ...................... 06 54931

(51) Int. Cl.
  *B32B 37/02* (2006.01)
  *B32B 38/04* (2006.01)
(52) U.S. Cl. .......... 156/270; 156/302; 156/64; 156/353; 156/378; 156/522
(58) Field of Classification Search .................. 156/270, 156/302, 64, 353, 378, 522
See application file for complete search history.

(56) References Cited

U.S. PATENT DOCUMENTS

| 4,170,511 | A | * | 10/1979 | Milne | 156/498 |
| 4,724,027 | A | | 2/1988 | Piltz et al. | |
| 4,785,698 | A | | 11/1988 | Stork | |
| 7,128,793 | B2 | * | 10/2006 | Haldner et al. | 156/64 |

FOREIGN PATENT DOCUMENTS

| BE | 699571 A | 11/1967 |
| EP | 0220646 A2 | 5/1987 |
| FR | 2307625 A | 11/1976 |
| GB | 2037626 A | 7/1980 |
| GB | 2338448 A | 12/1999 |

OTHER PUBLICATIONS

International Search Report of PCT/FR2007/052349, Mailing Date of Mar. 26, 2008.

* cited by examiner

*Primary Examiner* — Linda L Gray
(74) *Attorney, Agent, or Firm* — Westerman, Hattori, Daniels & Adrian, LLP

(57) ABSTRACT

The invention relates to a complex section (1) consisting of a metal section (2) covered with a metal foil (3). It is characterized in that the foil (3) has a higher surface hardness than the section (2) and in that the foil (3) adheres to the section (2) at all points on one of its faces. It also relates to a method of coating sections (2), which consists in conveying them, one after another, in successively applying to them, after shaping, a continuous strip (5) of a material (3) for bonding it to each section, in order to cover it, characterized in that these sections (2) are conveyed with a gap between them, in that, after adhesion, the respective downstream (6A) and upstream (7B) ends of two successive sections (2A, 2B) are identified and in that two separate cutting operations, according to their spacing, are carried out thereon.

20 Claims, 1 Drawing Sheet

COMPLEX SECTION CONSISTING OF A METAL SECTION COVERED WITH A METAL FOIL

BACKGROUND OF THE INVENTION (1) Field of the Invention

The present invention relates to a complex profile bar consisting of a metal profile bar coated with a metal foil.

The invention also relates to a method for manufacturing such a complex profile bar.

The invention also relates to a device for implementing this method.

The present invention falls within the field of the building ironmongery.

The invention relates in particular to the profile bars used as accessories in the finishing of the building.

These profile bars are in general intended to be used as accessories for the installation of floating parquet, or as junction elements between floor and/or wall elements, such threshold bars, nosings, plinths or the like.

Other applications relate to closing parts of the building: doors, windows, blinds, verandas, fences or the like, as well as all the fields in which profile bars are of an interest as safety or junction parts: electric ducts, tiling ends, or also as decoration elements.

(2) Description of the Prior Art

It is known to use profile bars made of aluminium alloy, or of plastic, even of wood, coated with paper or plastic films, on coating lines. These coatings allow a wide choice of decorations.

However, these profile bars, which are designed for domestic use, are poorly suited for intensive professional use.

The manufacture of metal profile bars, made of metals or of aluminium alloys, brass or the like, provides a first solution for this problem of strength. Nevertheless, such profile bars made of material with low surface hardness are sensitive to scratching, and their surface is quickly degraded, when they are subjected to intense traffic.

There is a strong market demand for stainless-steel profile bars, which would have, in addition to a perfect appearance, a good resistance both to corrosion, scratching and to impacts, and would meet the sanitary constraints specific to the hospital environments or also to the food-processing industry.

The manufacture of mass metal profile bars tried to meet this need. These profile bars are expensive because of the costs of material and the extrusion tools. In addition, the particular shapes of such profile bars include significant differences in cross-section as well as very small radii of curvature, even profile bars with sharp edges, which makes their manufacture by drawing very problematic. The too disparate internal tensions result into cracks or other defects, which make the profile bar unsuitable for its use. Finally, the manufacturing time for the tools does not allow reacting to a need of the market.

It has also be devised to apply a metal profile bar of a suitable strength against a structure such as another profile bar, in particular a metal profile bar, by screwing, welding, riveting or another mechanical fastening means of a high cost.

It should also be noted that the coating of a profile bar with a film on a coating line is a difficult operation, because of the multiplicity of technical problems: preparation of the surfaces, tension of the film, temperature, hygrometry, control of the quantity of adhesive and the shaping and application means, among others, and which are to be solved simultaneously, in order to avoid adherence or appearance defects, such as air bubbles, creasing, tear or the like, which make the product unsuitable for any use.

The specialist in the art, who has been faced for some twenty years with the market's need for profile bars with a hard metal surface, and because of the existing problems for coating with so-called easy-to-process films, has been dissuaded from any trying to continuously coat profile bars with a metal foil made of hard material having a sufficient thickness to meet the service-load stresses.

From BE 699 571 is known a complex metal-on-metal profile bar achieved by close adjustment. This does not guarantee a perfect adherence at all points. In addition, the method this document describes is applicable only to some very particular profiles of profile bars made of aluminium and including side openings, i.e. grooves in which a foil can be crimped, which considerably limits the field of application.

Another document, GB 2 037 626 A, contemplates to insert an adhesive, or a double-face adhesive tape between the profile bar and the foil. Here too, no guarantee of adherence is to be expected.

In short, the prior art only provides solutions in which the adherence of the foil to the profile bar is not, or badly, guaranteed, which is incompatible with applications in the field of building joinery, where the profile bars are subjected to high service-load stresses. It should be noted that due to lack of guarantee of adherence, no metal profile bar coated with a metal foil is offered on the market.

SUMMARY OF THE INVENTION

Therefore, the present invention is in contradiction with the prejudices of the specialist in the art, by providing a complex profile bar consisting of a metal profile bar coated with a metal foil with a perfect adherence to each other.

The invention also relates to an advantageous method for manufacturing such profile bars coated with a metal foil.

The continuous manufacture of such profile bars coated with a metal sheet implies that a neat cutting at each end of the profile bar should necessarily be ensured at the end it is.

The cutting by shearing usually implemented in the case of coating profile bars with the plastic film cannot at all be suitable. Though there are manual solutions, the present invention advantageously meets the need for an automated process and a continuous manufacture.

The solution according to the invention has been able to solve the problem by providing between the profile bar lengths sufficient space to allow the implementation of means for cutting, in particular by milling.

The invention also consists in the design of an appropriate device for carrying out this cutting operation.

To this end, the invention relates to a complex profile bar consisting of a metal profile bar coated with a metal foil, wherein said metal foil has a surface hardness higher than that of said profile bar, and said foil adheres to said profile bar at any point of one of the faces of said foil.

The invention also relates to a method for coating profile bar lengths consisting, in a production line, in:
 conveying successively and one after another said profile bar lengths,
 applying successively on these profile bar lengths, eventually after pre-forming, a continuous strip of coating material for gluing same onto each profile bar length, in order to coat it on the face or faces to be coated,
wherein:
 the conveying of said profile bar lengths one after another is carried out with a distance between them, after adhesion, the upstream and downstream ends, respectively, of two successive profile bar lengths are detected, at these two ends, upstream and downstream respectively, two different cutting operations are performed, taking into consideration the distance between said profile bar lengths.

According to a feature of the invention, a metal foil is chosen for said continuous strip.

According to a feature of the invention, stainless steel is chosen for said metal foil.

The invention also relates to a device for implementing this method, wherein the device comprises detecting means capable of detecting the first downstream or/and the second upstream end of each profile bar length, and double cutting means.

Other features and advantages of the invention will become clear from the following detailed description of non-restrictive embodiments of the invention, with reference to the attached figures.

DETAILED DESCRIPTION OF THE PREFERRED EMBODIMENTS

Figure 1:
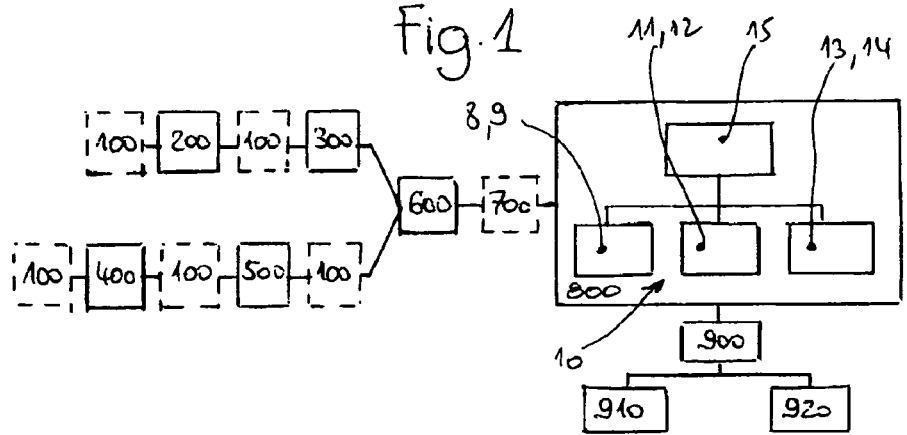
FIG. 1 schematically represents a logical diagram of the method according to the invention.

The invention relates to a complex profile bar 1 consisting of a profile bar length 2, preferentially in the form of a metal alloy, and in particular of aluminium alloy, coated with a metal foil 3, in particular for the field of the finishings of the building.

In an innovating way, the metal foil 3 has a surface hardness higher than that of the profile bar 2 it surrounds. This foil 3, which includes two main faces corresponding to its greater side surfaces, is fixed to the profile bar 2 so as to adhere at any point of one of these two faces to this profile bar.

The invention relates to a method for manufacturing such profile bars 1 coated with a metal foil. According to this method:

pre-cut profile bar lengths 2 are conveyed successively and one after another under the action of conveying means, on these profile bar lengths 2 is successively applied, eventually after pre-forming 200 under the action of shaping means, a continuous strip 5 of coating material for gluing same onto each profile bar length 2, in order to coat it on the face or faces of the profile bar 2 to be coated, at least on a portion of its periphery, under the action of application means.

According to an essential feature of the invention, the conveying 400 of these profile bar lengths 2 one after another is carried out while generating 500 a distance between them.

This distance is chosen sufficient to allow the implementation of means for cutting, in particular by milling. And this distance is adjusted, at the level of the conveying of the profile bars, in the preferred case of milling by slitting saws, to a value at least equal to the total of the thicknesses of the slitting saws used.

Preferably, the coating includes a shaping of the continuous strip 5 around the profile bar length 2, and relates to the coating of several faces of the profile bar length 2 to be coated.

The implementation of a metal foil is difficult, at the level of a coating cycle, in particular in the phase of adjustment.

The usual methods for coating profile bars with plastic foils allow easy interventions during the adjustment or the production, when observing hazards such as defects on profile bars or the like: indeed, it is then always easy to cut the foil used for coating, for any intervention, or for a mere replacement of the reel. It is obvious that this is completely different in the case of a metal foil.

It has thus been contemplated, within the framework of the invention, to intercalate on the supply circuit of the metal foil for coating the profile bar, movable means for cutting the foil 3 before its sizing, designed capable of carrying out a cut perpendicular to its direction of progress and synchronously with the latter a cutting device, in order to be able to cut the foil before the sizing operation.

Preferably, a movable carriage, for example on ball slides, permits to follow the direction of progress of the foil. On this movable carriage, an oblique slide, in particular perpendicular to this direction of progress, permits to cause a cutting organ to move towards the foil. Preferably, this cutting organ can adopt the form of a blade, in particular with a triangular tip. A plate serving as a counter-blade can also be arranged in the extension of the cutting plane, on the other side of the foil. Preferably, the movable carriage also includes a set of jaws permitting to seize the foil in order to ensure the synchronization of the cutting motion with the progress of the foil.

The coating of a metal profile bar 2 with a continuous strip 5 consisting, according to the invention, of a metal foil 3, in particular of a stainless-steel foil in the preferred application of the invention, raises new problems, compared to the coating of a profile bar with any foil whatsoever.

The main problem is that of the separation of the coated profile bar lengths.

Indeed, the usual methods for separating profile bars coated with plastic foils or the like, as well as cutting on the fly or cutting with a blade and a counter-blade, are absolutely unusable. On the one hand, the thickness and the shear strength of the metal foil 3 require the implementation of particular cutting means pertaining to the machining of metals, especially in the preferred case of using a stainless-steel foil. On the other hand, the relative positioning, with respect to the continuous strip 5, of the successive profile bar lengths 2, after the adhesion, is irregular because of the possibility of a relative sliding between the profile bar lengths 2 and the continuous strip 5 before complete immobilization. Two successive profile bar lengths 2A, 2B are usually separated by a variable distance which can be of a few millimeters or a few tens of millimeters.

The development of the cutting operations thus requires the implementation of a particular method and particular means.

It is thus necessary to proceed to a cut at the level of each end of each profile bar length 2, the first downstream end 6 and the second upstream end 7, in order to separate the coated length 1 from the continuous strip 5.

Thus, the cutting of a profile bar should be carried out with an automated process while continuously moving in a production line 4, without interrupting the progress of this line 4, after completion of the coating and the application 600 of the continuous strip 5 on the profile bar lengths 2, and complete adhesion.

In order to solve this new problem, the invention implements 800 cutting means 10, which are of the type double cutting means, designed to carry out the cuts on the fly.

Figure 2:
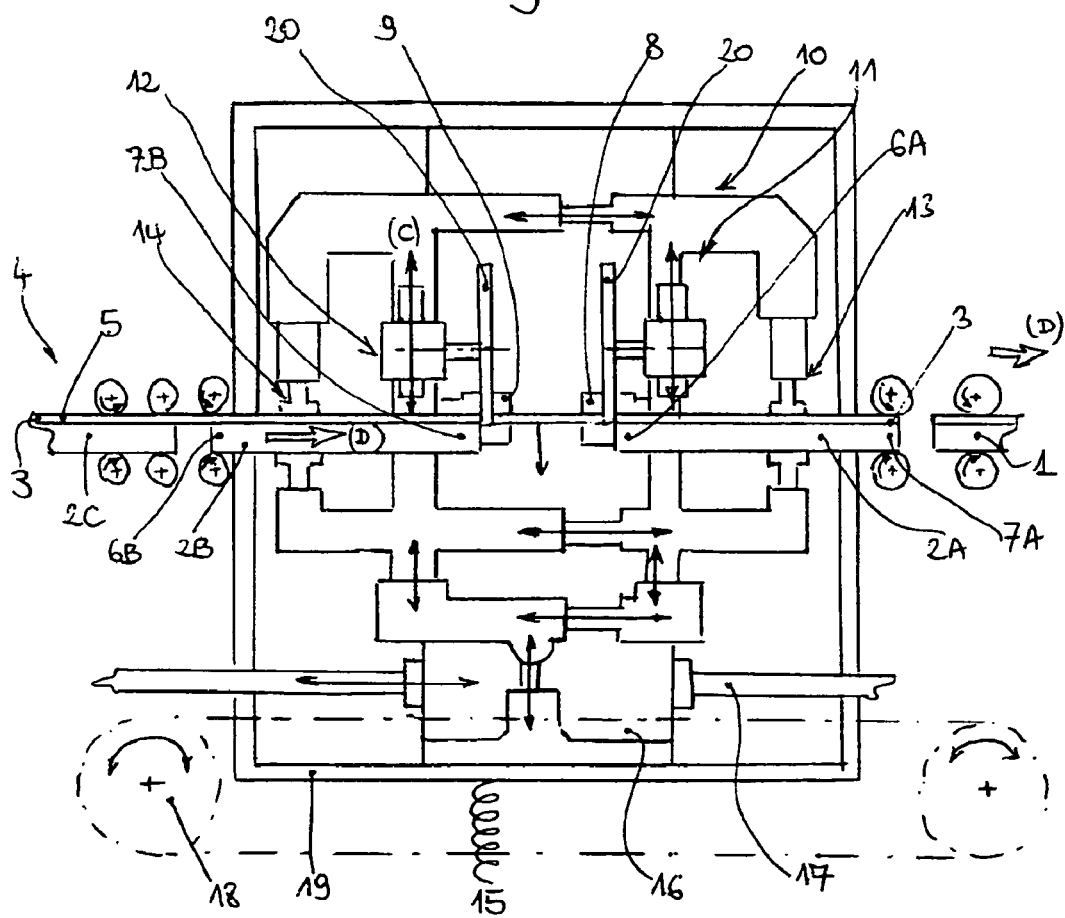
FIG. 2 schematically represents a partial and elevation view of a device for implementing the method according to the invention.

These cutting means 10 include detecting means, consisting of downstream 8 and upstream 9 detecting means, which are capable of detecting the downstream 6 or/and upstream 7 end of each profile bar length 2. In the preferred application, as can be seen in FIG. 2, the downstream 8 and upstream 9 detecting means detect the downstream 6A and upstream 7B ends, respectively, of two successive lengths 2A, 2B. These detecting means 8, 9 will permit to proceed, at these two ends, to two different cutting operations, taking into consideration the distance between said profile bare lengths 2A and 2B.

The downstream 8 and upstream 9 detecting means transmit, in real time, the position of the ends 6A and 7B to the control and management means 15. The latter control the movements of at least two cutting tools, downstream 11 and upstream 12, which are movable in the longitudinal direction D of progress of the profile bar lengths 2, and with respect to each other, in order to synchronize each of them with the profile bar length involved 2A, 2B, at each cutting operation.

In a preferred application, the detecting means 8, 9 consist of photocells or the like, and the control and management means 15 of a programmable automaton, or the like.

The downstream 11 and upstream 12 cutting tools can be designed movable in at least one cutting direction C, preferably orthogonal to that of displacement of the profile bar, or also include cutting organs having this mobility.

In short, the control and management means 15 are designed so as to control the displacements of the various tools 11, 12 and movable cutting organs in the various directions D, C. They manage the longitudinal distance of the movable cutting tools 11, 12 according to the actual distance between the successive profile bar lengths 2A, 2B determined by the detecting means 8, 9.

Preferably, but non-restrictively, these cutting means are grouped on one single cutting device.

This cutting device is then designed movable, under the action of motorization means 18 controlled by the control and management means 15, parallel to the longitudinal direction D, and preferably consists of a carriage 16 co-operating with means for guiding 17 in this direction. It is thus made capable of following each profile bar in its progress towards the exit of the production line, as well as returning upstream to follow the next profile bar.

In a preferred embodiment, as can be seen in FIG. 2, each movable cutting tool 11, 12 includes means for driving, such as an electric motor or the like, a cutting organ 20, such as a slitting saw.

The control and management means 15 position a downstream cutting tool 11 so that its cutting organ 20 coincides with the downstream end 6A of a first profile bar 2A so as to permit the milling of the continuous strip 5 of metal foil 3 at the location of this end 6A.

Downstream clamping means 13, integral in longitudinal translation with said movable cutting tool 11, are then actuated in order to maintain this profile bar length 2A during the cutting operation.

Preferably simultaneously, the control and management means 15 longitudinally position an upstream movable cutting tool 12 so that its cutting organ 20 coincides with the upstream end 7B of the profile bar length 2B adjacent in upstream direction to the first profile bar length 2A that is most downstream.

Similarly, upstream clamping means 14, integral in longitudinal translation with the upstream movable cutting tool 12, are actuated in order to maintain the profile bar length 2B during the cutting operation.

Upon completion of the two cuts, the downstream clamping means 13 release the most downstream profile bar length 2A, so as to permit its conveying to an exit station, namely a checking and packing station, the latter operations being preferably carried out continuously.

Upon complete release of the downstream 13 and upstream 14 clamping means, the control and management means 15 impart to the downstream 11 and upstream 12 movable cutting tools, or to the carriage 16 that carries them, an order to move in translation in the opposite direction with respect to that of the profile bar, so as to bring the cutting means 10 back into a more upstream position, and to make them capable of performing a new cutting operation.

It is obvious that it is possible to individualize the movements of each downstream 11 or upstream 12 movable cutting tool in the cutting direction C and in the longitudinal direction D. In order to simplify the control and maintenance, the movements are advantageously coupled to each other, when this is possible. In the embodiment as visible in FIG. 2, the movements of the two downstream 11 or upstream 12 movable cutting tools in the cutting direction C are combined, which permits to reduce the number of components.

For a clean production line, each movable cutting 11, 12, is advantageously surrounded by a casing 19 designed capable of being connected to means for sucking up vapour, dust and chips, even foil scraps, resulting from the cutting operations. It is obvious that in the particular embodiment in which two movable cutting tools 11, 12 are installed on the same carriage 16, the latter advantageously includes such a single casing 19, which it is integral with.

This arrangement permits to preserve a compact and rather short production line 4, because it allows, during the progress of a profile bar length 2 the first downstream end 6 of which has been cut, a fast return into their upstream position of the cutting means 10 for the double cutting of its upstream end 7 as well as of the downstream end of the profile bar length that follows. It has in addition the advantage of permitting the mixing on the same production line of profile bar lengths 2 having different lengths.

It can of course also be contemplated, without departing from the spirit of this invention, to use such a device to control the movable cutting tools for simultaneously cutting the downstream end and the upstream end of one and the same profile bar length. In this case, upon adhesion of the strip 5 to the profile bar length 2, the downstream 6A and upstream 7A ends of one and the same profile bar length 2A are detected, then two different cutting operations are proceeded to at these two downstream 6A and upstream 7A ends, taking into consideration the distance between same and the position of the profile bar length 2A.

Finally, after cutting 900 is carried out, on the one hand, downstream, the evacuation 920 of each finished and cut complex profile bar length 1 and, on the other hand, the evacuation 910 of the continuous strip scraps 5 and the waste resulting from the cutting operations. The evacuation of the finished profile bar lengths 1 can occur in several ways, in the direction D as visible in FIG. 2, or transversely, or otherwise.

It should be noted that the cutting means 10 are multi-task means, which permits their easy conversion for another use, such as continuous cutting, for example of product resulting from drawing, by implementing only one of the movable cutting tools 11, 12.

The cutting means 10 according to the invention are preferably designed removable, and then include means for detecting and fixing with respect to a machine reference, so as to permit to make the line available for coating profile bars for other applications, as well as the transfer of these cutting means 10 to other coating lines, depending on the productions to be made.

In addition to this main problem of cutting at the ends of the profile bar lengths, there are other problems specific to the implementation of a metal foil 3 as a continuous coating strip 5.

According to a particular feature of the invention, the stainless-steel foil is subjected, before its use in the production line, to a treatment for reducing the residual stresses of the stainless steel.

The surface preparation of the supports for their adhesion is particularly important. A mechanical or/and chemical preparation treatment 100 is generally necessary to achieve the desired quality of the coated profile bar.

A mechanical preparation treatment can be carried out in particular by continuous abrasion or/and brushing of the foil or/and the profile bar on at least one of its faces.

A chemical preparation treatment can consist in particular of a treatment for opening the surface pores of the material.

Particular problems are inherent to the profile bars to be coated and to the way they are obtained, in particular by drawing. One should mention in particular the presence of graphite in the pores of the aluminium profile bars, which constitutes a considerable hindrance during gluing when an adequate preparation for eliminating the graphite has not been carried out before this operation.

The preparation treatment can include the application of a primer.

It can also include a heat treatment for evaporating the solvents after application of a primer, should such be the case.

As can be seen in the logical diagram of FIG. 1, these preparation treatments 100 can occur at different stages of the process, depending on their nature.

For the pre-forming 200 of the continuous strip 5, the means for shaping the continuous strip around the profile bar, as well as the means for applying the coated continuous strip 5 on the profile bar length 2, traditionally consist of sequences of cylinders, rollers, flat bars and various pre-formers. Because of the high strength of the material to be shaped, it can be necessary to choose a particular dimensioning, or also to use pressure means such as jacks or also springy restoring means, such as springs.

It is generally difficult to proceed to sizing the profile bar, because of its shape, it is therefore preferable to proceed sizing the continuous strip. For sizing 300 and gluing the continuous strip to the profile bar, glue application means are preferably used. The latter consist in particular of rollers or tubes with lips, or flow-controlled guns.

Application means 600 maintain the continuous strip 5 and the profile bar 2 integral with each other during their adhesion to each other. Parallel to or downstream of the latter are added, in a preferred embodiment, finishing or/and drying means 700, which can namely include calibration or supporting rods, adhesion-accelerating means, namely heating or/and cooling elements, means for depositing a protection film, labelling means, or the like.

According to a particular feature of the invention, the foil used has a thickness ranging from 50 to 200 microns, these values included.

Preferably, but non-restrictively, the material of the profile bar lengths is chosen among an aluminium or/and copper or/and zinc alloy.

The method as described here is particularly satisfactory for the coating of non-metal profile bars. In a particular application, the operation has been applied to a profile bar made of plastic, preferably PVC, for its coating with a foil of aluminium alloy having a thickness ranging from 50 to 300 microns, preferably from 80 to 200 microns, and namely with a value of 150 microns.

What is claimed:

1. Method for coating lengths of profile bars made of plastic or metallic material in a production line, comprising, without interrupting a progress of the production line:

conveying a plurality of profile bars successively and one after another in the production line, coating a face or faces of each of the profile bars with a metal foil, by applying a continuous strip of coating material forming the metal foil on the profile bar, wherein the metal foil has a surface hardness higher than that of said profile bar, causing said foil to adhere to said profile bar at any point of one of the faces of the metal foil, and after adhesion, performing at least one of the following:

(i) detecting upstream and downstream ends of two successive profile bars, and at these two ends, upstream and downstream respectively, performing two different cutting operations, taking into consideration the distance between said profile bars, and (ii) detecting upstream and downstream ends of one and the same profile bar, and at these two ends, upstream and downstream, performing two different cutting operations, taking into consideration the distance between said ends and the position of said profile bar.

2. Method for coating profile bar lengths according to claim 1 in a production line, wherein:

after adhesion, the upstream and downstream ends, respectively, of two successive profile bars are detected, and at these two ends, upstream and downstream respectively, two different cutting operations are performed, taking into consideration the distance between said profile bars.

3. Method for coating profile bar lengths according to claim 1, wherein:

after adhesion, the upstream and downstream ends of one and the same profile bar are detected, at these two ends, upstream and downstream, two different cutting operations are performed, taking into consideration the distance between said ends and the position of said profile bar.

4. Method according to claim 1, comprising, during the coating, shaping said continuous strip of metal foil around said profile bar, said coating being carried out on several faces of said profile bar.

5. Method according to claim 2, wherein two different cutting operations are carried out using slitting saws, taking into consideration the distance between said profile bars, and this distance is adjusted to a value at least equal to a total of thicknesses of the slitting saws used.

6. Method according to claim 1, wherein said continuous strip is a stainless-steel foil having a thickness ranging from 50 to 200 microns.

7. Method according to claim 1, wherein said profile bars are made in a metal alloy or an aluminium alloy.

8. Method according to claim 1, wherein said profile bars are made of plastic and the metal foil is made of aluminium alloy.

9. Device for implementing the method according to claim 1, wherein the device comprises:

a production line comprising a conveyor that conveys a plurality of profile bars successively and one after another with a distance between them, without interrupting a progress of the production line, an applicator that coats each of the profile bars by applying a continuous strip of coating material forming a metal foil onto a face or faces of each profile bar, wherein the metal foil has a surface hardness higher than that of said profile bar, and wherein the metal foil is caused to adhere to said profile bar at any point of one of the faces of metal foil, upstream and downstream detecting means that detect the first downstream end or/and the second upstream end of each profile bar after adhesion of said continuous strip on the profile bar, and movable cutting means that perform a double cut according to a longitudinal direction of progress of the profile bars in the production line.

10. Device according to claim 9, wherein said cutting means include at least two movable cutting tools independent from each other according to the longitudinal direction of progress of the profile bars, and each configured to cut the profile bars in a cutting direction.

11. Device according to claim 9, wherein said cutting means include means for clamping the profile bars during cutting.

12. Device according to claim 9, wherein said cutting means are controlled by control and management means depending on the position detection carried out by said upstream and downstream detection means.

13. Device according to claim 9, wherein said cutting means are grouped on one single cutting device, configured to move, under the action of motorization means, parallel to said longitudinal direction of progress of the profile bars.

14. Device according to claim 9, wherein the device includes movable means for cutting said foil before gluing said foil, by carrying out a cut perpendicular to a direction of progress of the foil, and synchronously with the movable means, a cutting device configured to cut the metal foil before a sizing operation.

15. Device according to claim 14, wherein said movable means for cutting the foil includes a carriage movable in a direction of progress of the foil, an oblique slide, and a cutting organ mobile along the oblique slide towards the foil, the movable carriage including a set of jaws configured to seize the metal foil to ensure synchronization of the cutting motion with the progress of the foil.

16. Device according to claim 15, wherein the oblique slide is perpendicular to the direction of progress of the metal foil.

17. Device according to claim 15, wherein the cutting organ is a blade with a triangular tip.

18. Device according to claim 10, wherein each of said cutting means is configured to cut the profile bars in a cutting direction orthogonal to the longitudinal direction of progress of the profile bars.

19. Device according to claim 13, wherein said cutting means comprise a carriage co-operating with means for guiding the carriage in the longitudinal direction of progress of the profile bars.

20. Method according to claim 8, wherein said profile bar is made of PVC and the metal foil of aluminium alloy has a thickness ranging from 50 to 300 microns.

* * * * *